US009364064B2

(12) United States Patent
Day

(10) Patent No.: US 9,364,064 B2
(45) Date of Patent: Jun. 14, 2016

(54) ATTIC DOOR ROPE APPARATUS

(71) Applicant: Kevin Day, Dallas, TX (US)

(72) Inventor: Kevin Day, Dallas, TX (US)

(73) Assignee: DayCo Holdings, LP, Dallas, TX (US)

( * ) Notice: Subject to any disclaimer, the term of this patent is extended or adjusted under 35 U.S.C. 154(b) by 87 days.

(21) Appl. No.: 14/152,416

(22) Filed: Jan. 10, 2014

(65) Prior Publication Data

US 2015/0197973 A1 Jul. 16, 2015

(51) Int. Cl.

| | |
|---|---|
| ***H02G 11/02*** | (2006.01) |
| ***A45C 13/28*** | (2006.01) |
| ***B65H 75/48*** | (2006.01) |
| ***E05F 11/04*** | (2006.01) |

(52) U.S. Cl.

CPC ................ *A45C 13/28* (2013.01); *B65H 75/48* (2013.01); *E05F 11/04* (2013.01); *B65H 2701/35* (2013.01)

(58) Field of Classification Search

CPC ................................ F16G 15/00; B65H 49/20

USPC ..................................................... 191/12.2 A

See application file for complete search history.

(56) References Cited

U.S. PATENT DOCUMENTS

| | | | | |
|---|---|---|---|---|
| 1,015,459 | A | 1/1912 | Riggle | |
| 1,606,621 | A | 11/1926 | Fischer | |
| 1,728,800 | A | 9/1929 | Makinen | |
| 2,649,237 | A | 8/1953 | Bjorklund | |
| 3,315,914 | A | 4/1967 | Turner | |
| 3,837,597 | A | 9/1974 | Bourhenne | |
| 4,117,991 | A | 10/1978 | Johnson | |
| 5,551,545 | A * | 9/1996 | Gelfman | 191/12.2 A |
| 5,841,259 | A * | 11/1998 | Kim et al. | 318/587 |
| 6,499,192 | B1 | 12/2002 | Sawyer | |
| 7,942,362 | B1 | 5/2011 | Rothell | |
| 8,028,804 | B2 | 10/2011 | Lair | |
| 2010/0315229 | A1 * | 12/2010 | Shin | 340/540 |

* cited by examiner

*Primary Examiner* — Sang Kim

(74) *Attorney, Agent, or Firm* — Klemchuk LLP; Kirby B. Drake

(57) ABSTRACT

An attic door rope apparatus for retractably storing an attic door rope may comprise a spool rotatably coupled with a rotation mechanism, and a stored-energy mechanism having a first end coupled with the spool and a second end coupled with the rotation mechanism, wherein the stored-energy mechanism is configured to impart a torque on the spool about a rotation axis of the spool. Another attic door rope apparatus for retractably storing an attic door rope may comprise a winding mechanism configured to rotate in an unwinding direction and a winding direction, a motor coupled with the winding mechanism configured to turn the winding mechanism in at least the unwinding direction, a sensor configured to detect a user command and send a command signal to the motor, and a power source in electrical communication with the motor and the sensor.

11 Claims, 15 Drawing Sheets

ATTIC DOOR ROPE APPARATUS

FIELD OF THE DISCLOSURE

The present disclosure generally relates to an attic door rope apparatus, and more particularly, to an apparatus for retractably storing an attic rope for opening and closing an attic door.

BACKGROUND

Many attics are accessed from a room below via a door and ladder system in the ceiling. Typically the door is hinged at one end, and may be pulled down from the ceiling to expose a foldout ladder. Ceiling mounted attic doors are often out of reach of the average person, so a rope is often provided to assist in pulling down the door from the room below.

The rope typically hangs down into the room below. This can be unsightly, and may get in the way of normal activity in the room. Some may attempt to tuck all or part of the rope into the door as it is closing, but this is often a frustrating and unsuccessful endeavor. Further, the result may still be aesthetically displeasing, and it may be difficult to retrieve the tucked in rope if it is out of reach or gets stuck.

SUMMARY

Embodiments of the present disclosure generally provide a retractable attic door pull for retractably storing an attic door pull rope.

The present disclosure is directed to an attic door rope apparatus for retractably storing an attic door rope, the apparatus comprising a spool rotatably coupled with a rotation mechanism, and a stored-energy mechanism having a first end coupled with the spool and a second end coupled with the rotation mechanism, wherein the stored-energy mechanism may be configured to impart a torque on the spool about a rotation axis of the spool.

In an embodiment, the stored-energy mechanism may be disposed within a substantially hollow portion of the spool. In another embodiment, the stored-energy mechanism may comprise a torsion spring.

In various embodiments, the attic door rope apparatus may comprise a rope guide configured to guide a rope extending from the spool towards a predetermined location. In another embodiment, the rope guide may comprise one or more rollers. In an embodiment, the rope may comprise a stop between a first end and a second end of the rope, the stop configured to catch on a portion of the apparatus when the rope is extended. In yet another embodiment, the stop may be configured to catch on a rope guide. In still another embodiment, the attic door rope apparatus may comprise a braking mechanism.

In various embodiments, the attic door rope apparatus may comprise a housing having a rope port. In an embodiment, the housing may comprise a substantially hollow elongated member protruding therefrom, the member in substantially concentric alignment with the rope port. In another embodiment, the attic door rope apparatus may comprise a substantially hollow end cap configured to mate with the substantially hollow elongated member.

In another aspect, the present disclosure is directed to an attic door rope apparatus for retractably storing an attic door pull rope, the apparatus comprising a winding mechanism configured to rotate in an unwinding direction and a winding direction, a motor coupled with the winding mechanism configured to turn the winding mechanism in at least the unwinding direction, a sensor configured to detect a user command and send a command signal to the motor, and a power source in electrical communication with the motor and the sensor.

In various embodiments, the attic door rope apparatus may comprise a stored-energy mechanism configured to apply a torque to the winding mechanism in the winding direction. In an embodiment, the stored-energy mechanism may comprise a torsion spring.

In an embodiment, the motor may be configured to turn the winding mechanism in the winding direction. In another embodiment, the sensor may be configured to command the motor to turn the winding mechanism in the unwinding direction in response to a first user command, and in the winding direction in response to a second user command. In an embodiment, the motor may be a stepper motor.

In various embodiments, the sensor may comprise an optical sensor. In an embodiment, the user command may comprise a hand waving motion in detectable range of the optical sensor. In another embodiment, the sensor may comprise a touch sensitive mechanism. In yet another embodiment, the sensor may be configured to command the motor to turn the winding mechanism for a duration proportional to the duration of the user command. In still another embodiment, the sensor may be configured to issue the command signal to the motor only after detecting the user command for a predetermined duration.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure generally provide an attic door rope apparatus. In various embodiments, an attic door rope apparatus may be used to retractably store an attic door pull rope used in opening and closing a ceiling-mounted attic door. In various embodiments, an attic door rope apparatus may provide a pull rope to be pulled out to an extended position and then automatically retract the rope upon release. In various embodiments, an attic door rope apparatus may comprise a motor for extending and retracting a pull rope upon receiving a command from a sensor.

FIGS. 1-6B illustrate representative embodiments of attic door rope apparatus 100 and parts thereof. It should be understood that the components of attic door rope apparatus 100 and parts thereof shown in FIGS. 1-6B are for illustrative purposes only, and that any other suitable components or subcomponents may be used in conjunction with or in lieu of the components comprising attic door rope apparatus 100 and the parts of attic door rope apparatus 100 described herein.

Figure 1:
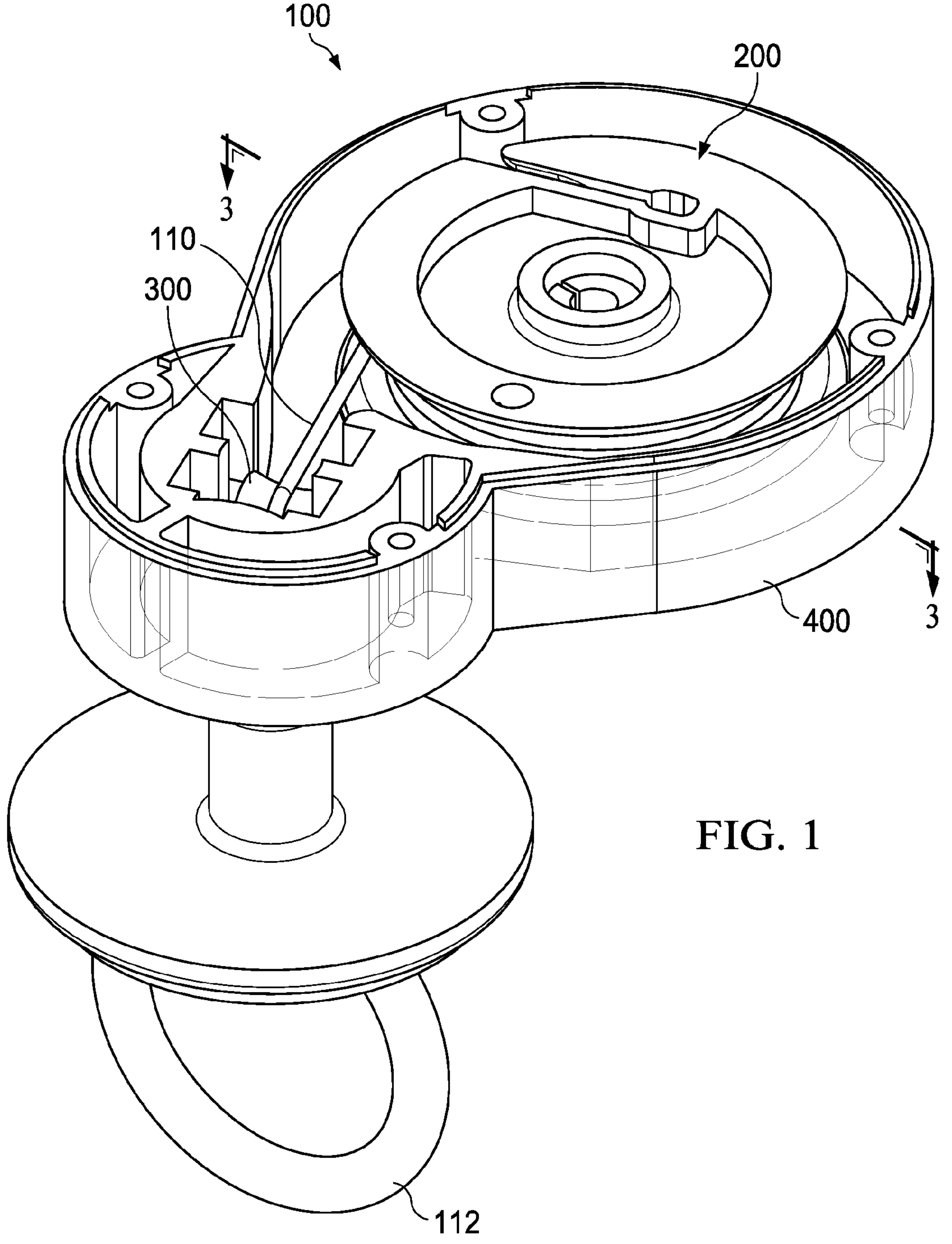
FIG. 1 depicts a perspective view of an attic door rope apparatus according to an embodiment of the present disclosure.

Referring now to FIG. 1, attic door rope apparatus 100 may generally comprise winding mechanism 200, one or more rope guides 300, and/or housing 400. In various embodiments, rope 110 (or similar mechanism, such as a cable, cord or chain, for example) may be installed in apparatus 100 and operate as described herein. In an embodiment, rope 110 may comprise grasping feature 112 (such as a knob, handle, or ring).

Figure 2A:
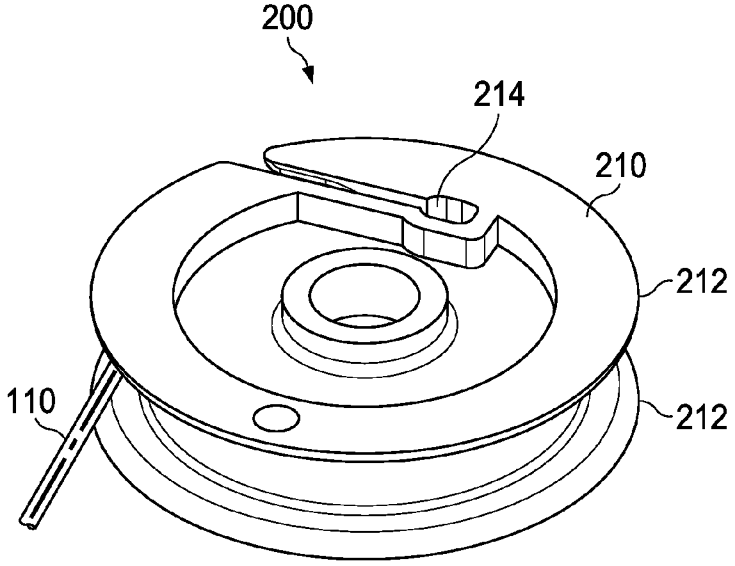
FIG. 2A depicts a perspective view of a winding mechanism according to an embodiment of the present disclosure.
Figure 2B:
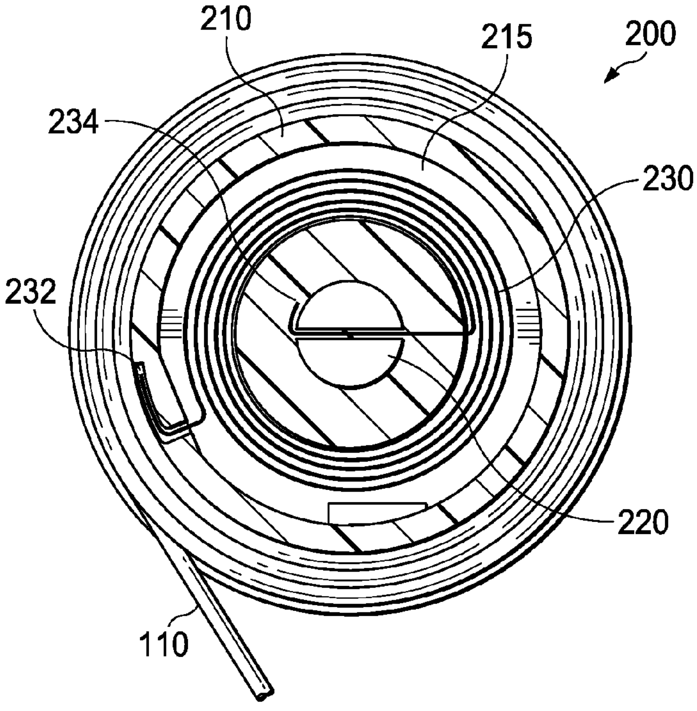
FIG. 2B depicts a top cutaway view of the winding mechanism of FIG. 2A according to an embodiment of the present disclosure.

Referring now to FIGS. 2A and 2B, winding mechanism 200 may comprise any suitable mechanism for winding and dispensing rope 110. Referring to FIG. 2A, in various embodiments, winding mechanism 200 may comprise spool 210. In an embodiment, spool 210 may be circular in shape. In another embodiment, spool 210 may comprise a channel formed by flanges 212 for guiding and retaining rope 110 thereon. In yet another embodiment, spool 210 may comprise recess 214 configured to receive stop 114 on rope 110 (later described in FIGS. 5A and 5B).

Referring to FIG. 2B, winding mechanism 200 may further comprise one or more rotation mechanism 220. Rotation mechanism 220 may comprise any suitable mechanism configured to provide for rotational motion of spool 210 about a rotation axis. In an embodiment, rotation mechanism 220 may comprise, in full or in part, a shaft running through spool 210 along the rotation axis of the spool. In another embodiment, rotation mechanism 220 may comprise a rotatable coupling between spool 210 and surrounding structure. Winding mechanism 200 may further comprise stored-energy mechanism 230. Stored-energy mechanism 230 may comprise any suitable mechanism for storing energy that may be used to effect winding motion in winding mechanism 200 and thereby retract rope 110 to a retracted position 120 (see, e.g. FIG. 5A). In an embodiment, stored-energy mechanism 230 may comprise a torsion spring. In an embodiment, stored-energy mechanism 230 may be disposed within a substantially hollow or recessed portion 215 of spool 210. In another embodiment, stored-energy mechanism may comprise first end 232 coupled with spool 210 and a second end 234 coupled with rotation mechanism 220. It should be appreciated that winding mechanism 200 and components thereof may comprise a multitude of mechanisms known in the art, and thus the present disclosure should not be limited to any particular embodiment specifically described herein.

Winding mechanism 200 may further comprise one or more braking mechanism 236 (later shown in FIG. 4B). Braking mechanism 236 may comprise any suitable component configured to slow the retraction of rope 110. In various embodiments, braking mechanism may comprise any component configured to apply friction to spool 210 as spool 210 rotates in a winding direction. In an embodiment, braking mechanism 236 may comprise a small piece of material such as cork or rubber, perhaps coupled with housing 400 (later described in FIGS. 4A and 4B), so as to rub on spool 210 during rotation. One having ordinary skill in the art will recognize that any suitable number of mechanisms or structure may serve to slow the retraction of rope 110, and the present disclosure should not be limited to this particular illustrative embodiment.

Figure 3:
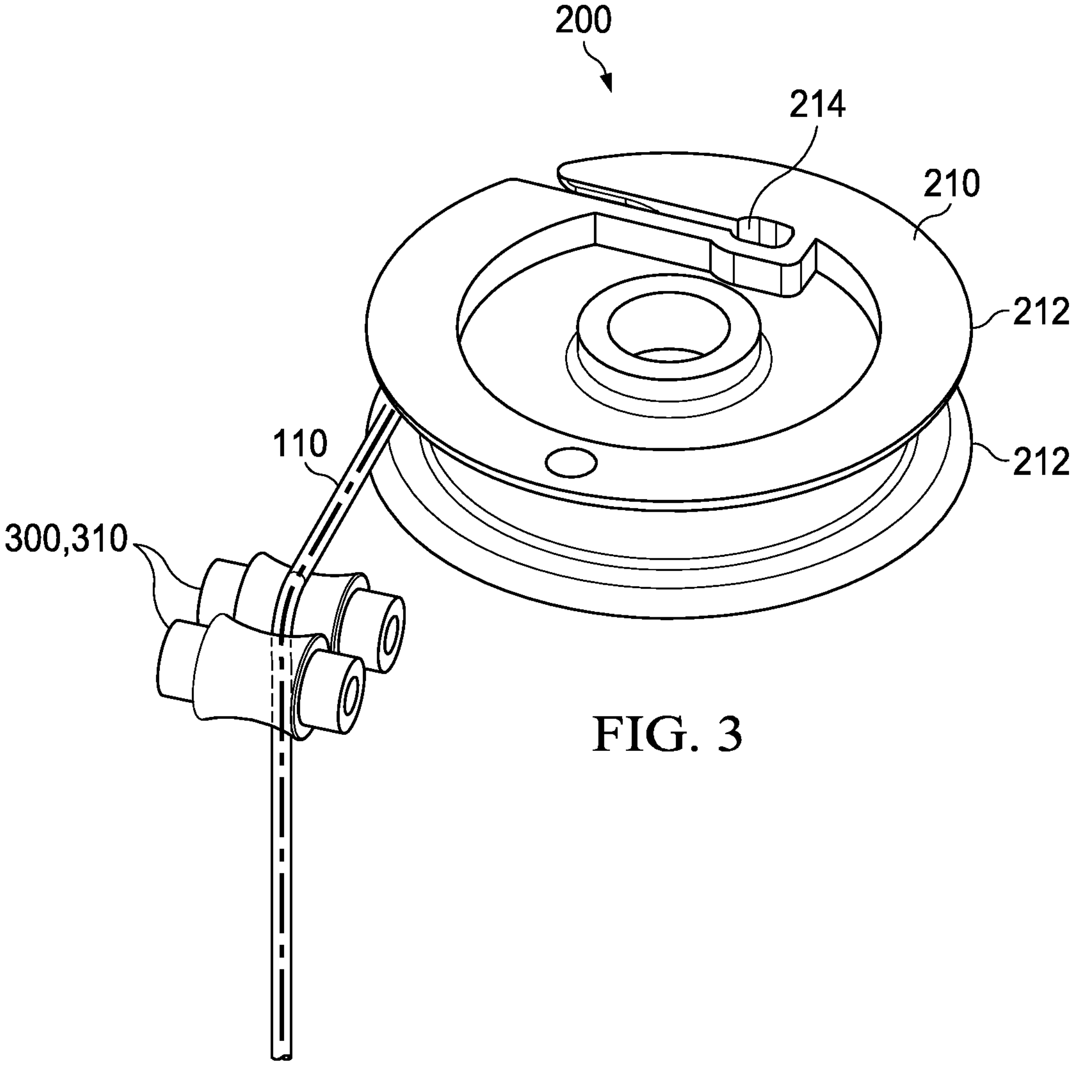
FIG. 3 depicts a perspective view of a rope guide according to an embodiment of the present disclosure.

Referring now to FIG. 3, attic door rope apparatus 100 may further comprise one or more rope guides 300. Rope guide 300 may comprise any suitable mechanism for guiding and/or facilitating the travel of rope 110 from winding mechanism 200 to a desired location. In an embodiment, rope guide 300 may comprise one or more rollers 310. In another embodiment, rope guide 300 may comprise a channel, tube or other such conduit, possibly defined by surrounding structure, such as housing 400 (not shown). One having ordinary skill in the art will recognize that any suitable number of mechanisms or structure may serve to guide and facilitate the travel of rope 110 from winding mechanism 200, and the present disclosure should not be limited to this particular illustrative embodiment.

Figure 4A:
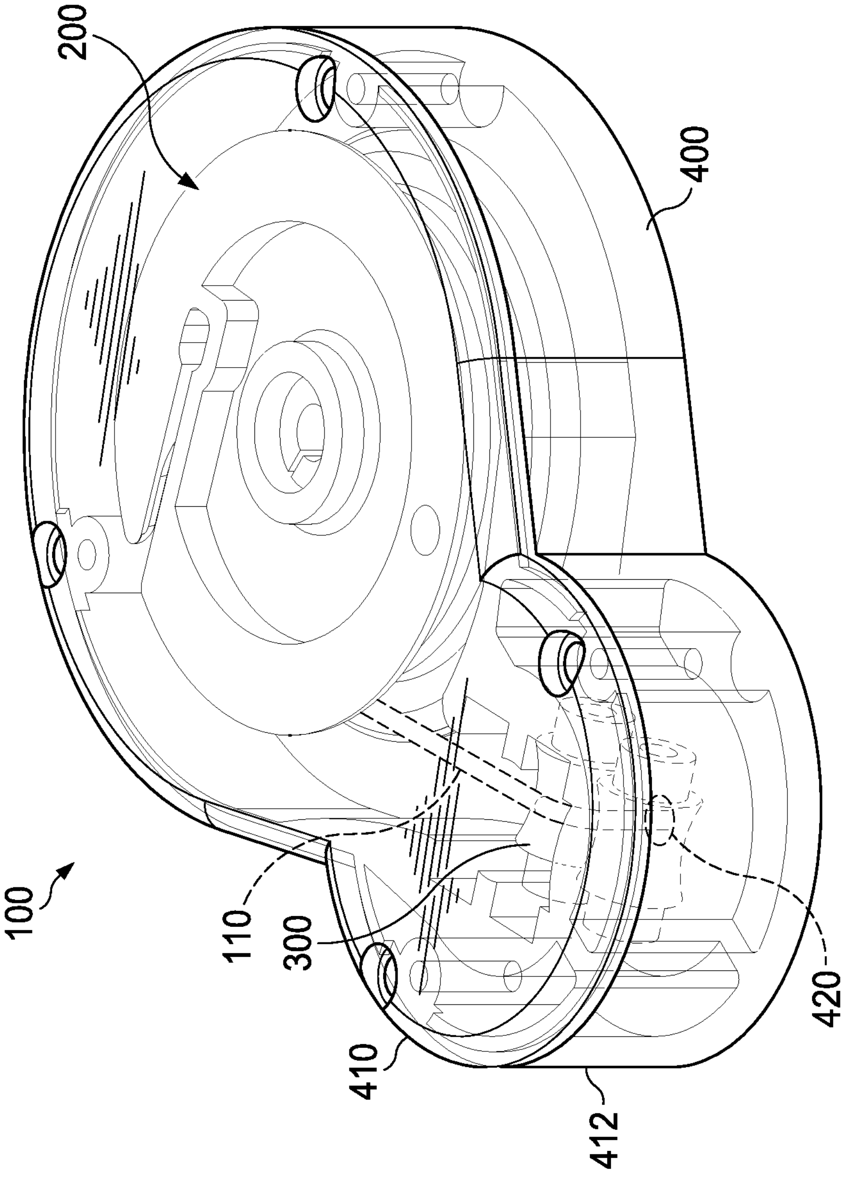
FIG. 4A depicts a perspective view of a housing according to an embodiment of the present disclosure.
Figure 4B:
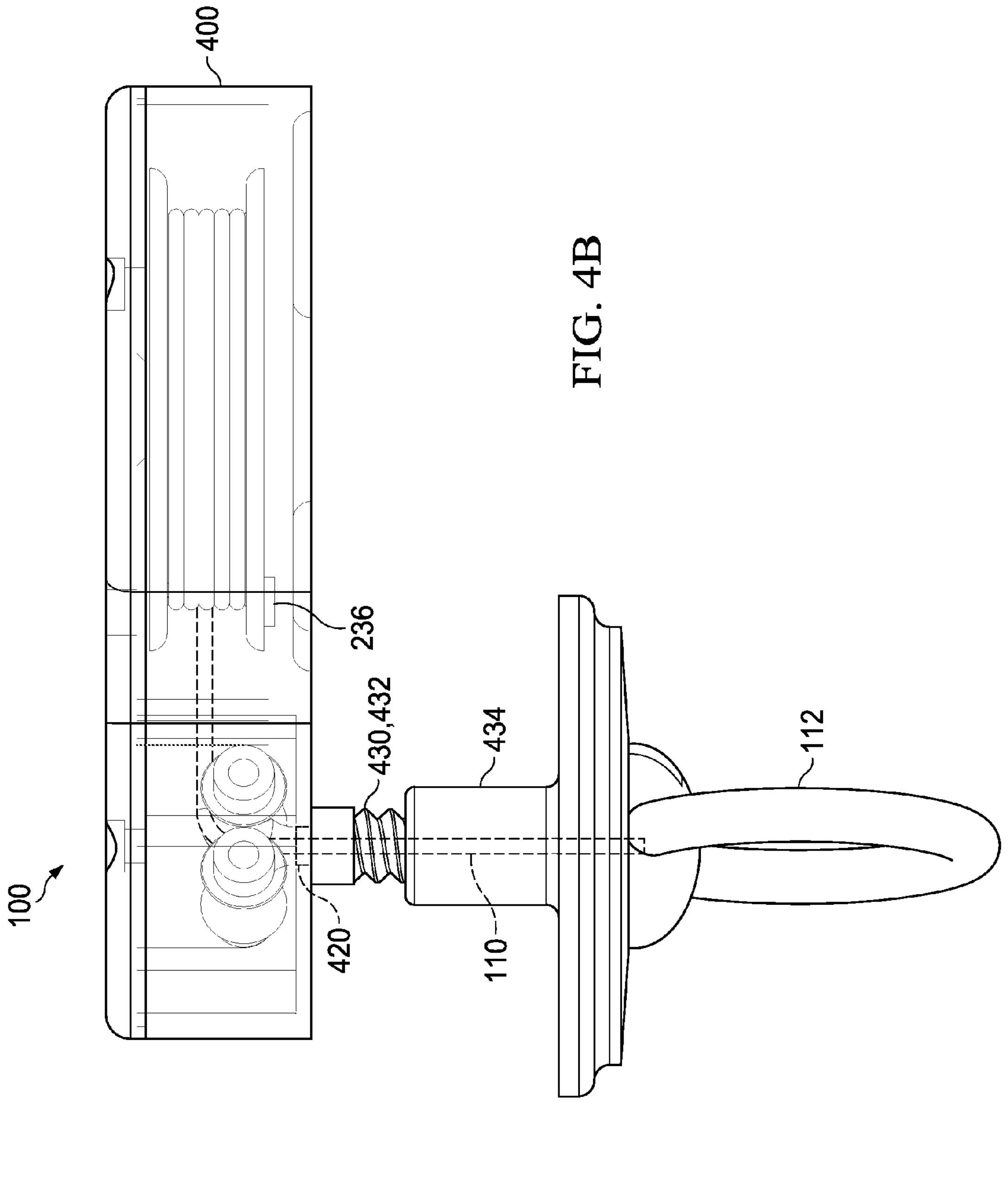
FIG. 4B depicts a side view of a housing according to an embodiment of the present disclosure.

Referring now to FIGS. 4A and 4B, attic door rope apparatus 100 may further comprise housing 400. Housing 400 may comprise any suitable structure for housing components of attic door rope apparatus 100. In various embodiments, housing 400 may further serve to arrange components of apparatus 100 relative to each other, and to couple apparatus 100 to a structure, such as an attic door (not shown).

Referring to FIG. 4A, in various embodiments, housing 400 may comprise any suitable shape, material, and construction including, but not limited to, plastic, metal, and wood. In various embodiments, housing 400 may comprise multiple sections, such as top section 410 and bottom section 412, which may be releasably coupled to provide access to components housed therein. In various embodiments, housing 400 may comprise port 420 through which rope 110 may pass. In various embodiments, port 420 may extend through a bottom surface of housing 400, or a side surface of housing 400. In an embodiment, rope guide 300 may be located proximate to port 420 to guide and possibly facilitate the travel of rope 110 therethrough.

Referring to FIG. 4B, housing 400 may further comprise one or more coupling elements 430 for coupling apparatus 100 to a structure. In various embodiments, coupling element 430 may comprise elongated member 432 protruding from housing 400. In an embodiment, elongated member 432 may be configured for insertion into a hole in a structure, such as a hole through an attic door. Coupling element 430 may further comprise end cap 434 configured to mate with elongated member 432, thereby securing housing 400 to the structure into which member 432 is inserted. In an embodiment, elongated member 432 and end cap 434 may be externally and internally threaded, respectively, to facilitate mating. In another embodiment, elongated member 432 may be externally threaded and configured to operate as a built-in screw, providing for elongated member 432 to be screwed into a structure when apparatus 100 is rotated. In another embodiment, elongated member 432 may be substantially hollow and oriented concentric with port 420, thereby providing a conduit through which rope 110 may pass. Similarly, end cap 434 may be substantially hollow to permit rope 110 to pass therethrough. In various embodiments (not shown), coupling element 430 may comprise a port for receiving a screw, nail, or other coupler. In an embodiment, one or more ports may extend through a bottom surface of housing 400, and each port may be configured to accept the shaft of a coupler therethrough, whilst preventing a larger diameter head of the coupler from passing through. It should be recognized that housing 400 and components thereof may comprise any number of suitable constructions known in the art, and should not be limited to specific embodiments of the present disclosure.

In various embodiments, housing 400 and other components of attic door rope apparatus 100 may be sized and arranged to minimize its footprint and other dimensions. In an embodiment, attic door rope apparatus 100 may be of a flat shape that may be easily mounted to an interior or exterior surface of an attic door. In another embodiment, apparatus 100 may comprise dimensions suitable to fit between or under folding stairs of an attic door.

Figure 5A:
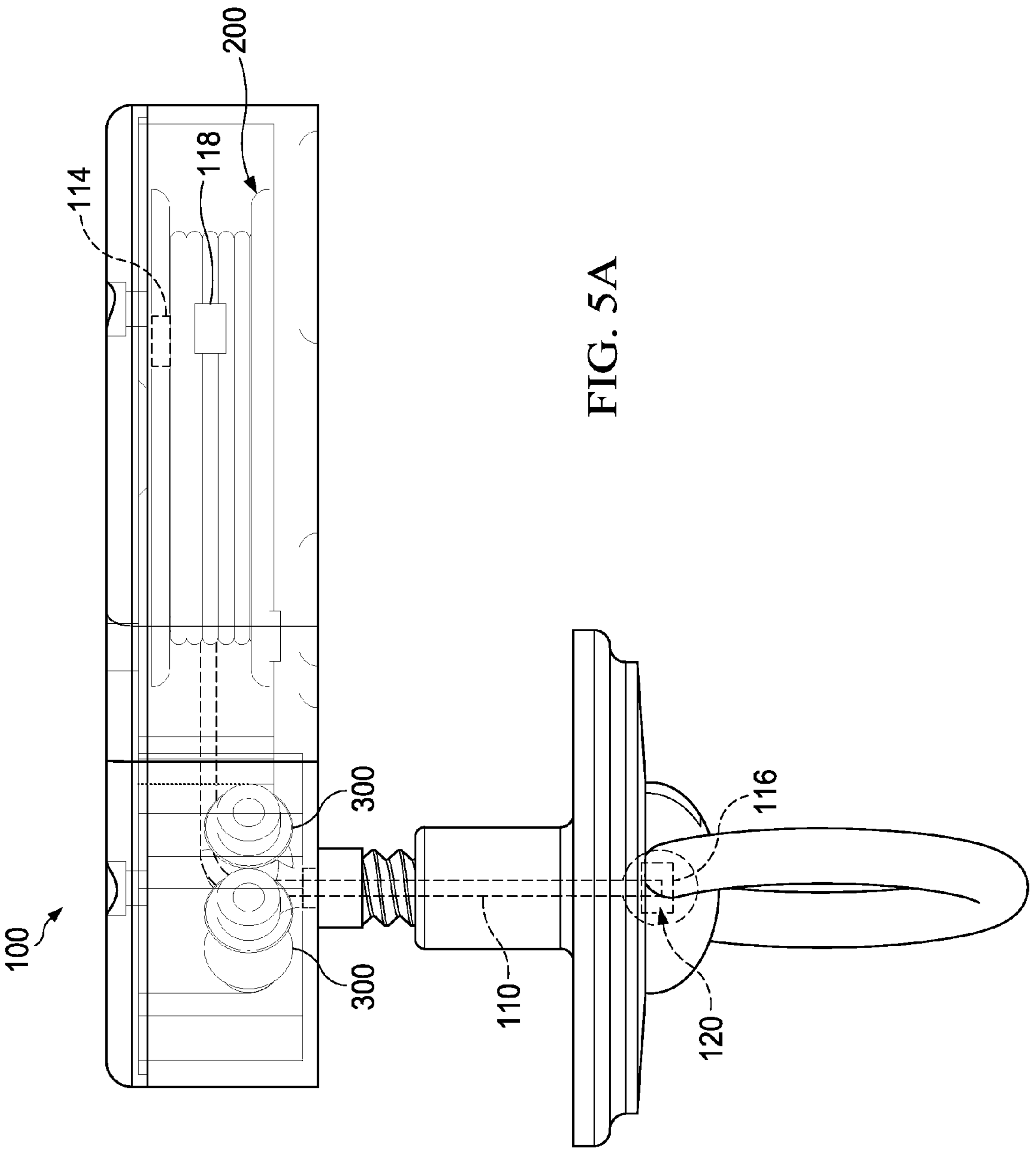
FIG. 5A depicts a side view of an attic door rope apparatus in a retracted position according to an embodiment of the present disclosure.
Figure 5B:
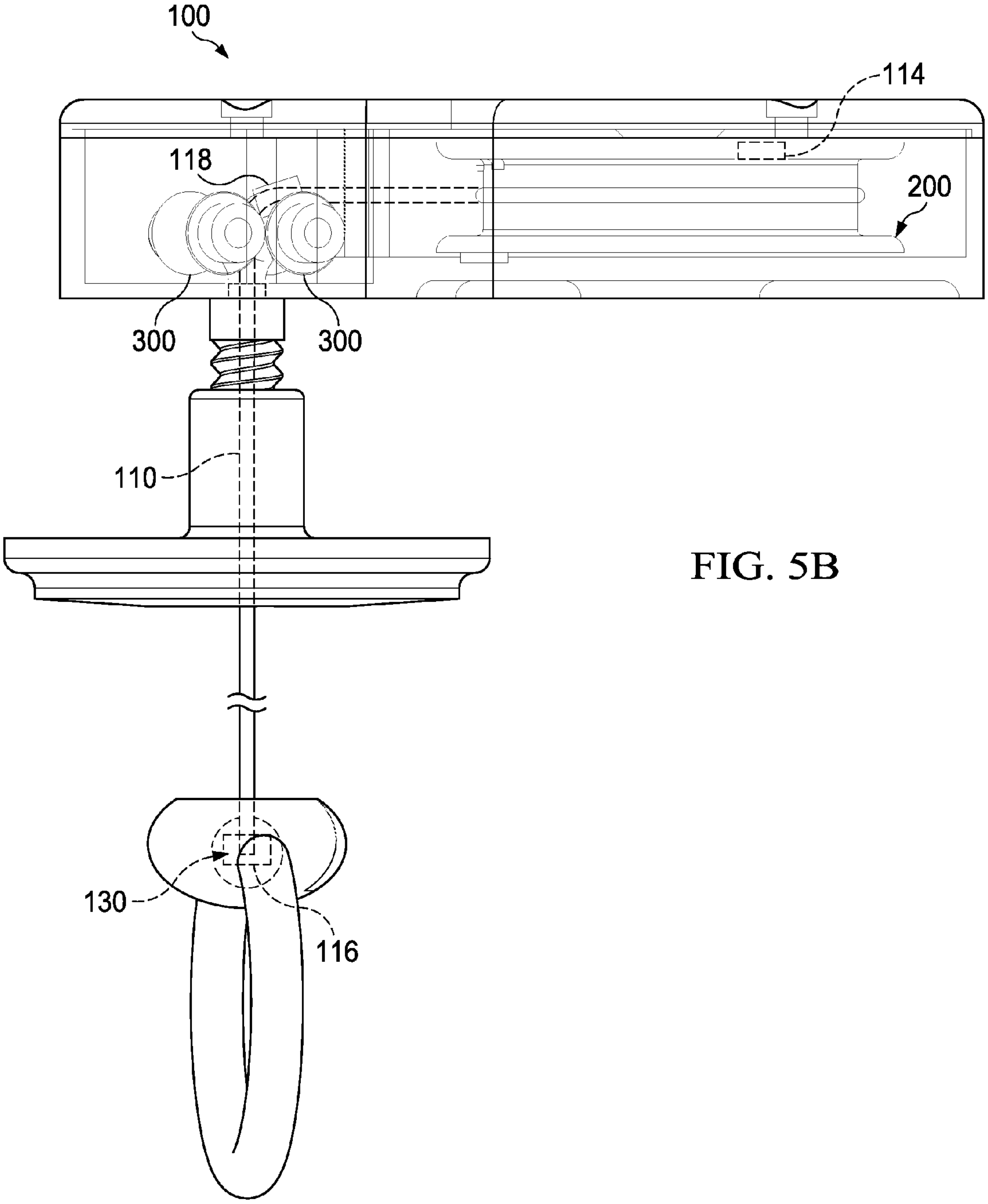
FIG. 5B depicts a side view of an attic door rope apparatus in an extended position according to an embodiment of the present disclosure.

Referring now to FIGS. 5A and 5B, rope 110 may comprise one or more stops 114, 116, and 118. In an embodiment, stop 114 may be located at or near a first end of rope 110. Stop 114 may be configured to fit within recess 214 in spool 210 and secure rope 110 thereto. In another embodiment, stop 116 may be located at or near a second end of rope 110. Stop 116 may be configured to prevent rope 110 from being retracted all the way into housing 400, and in some embodiments, may couple grasping feature 112 to rope 110.

In yet another embodiment, stop 118 may be located between a first and second end of rope 110, and may be configured to control how far rope 110 may extend from apparatus 100. For example, referring to FIG. 5B, stop 118 may be configured to "catch" on rope guide 300 when rope 100 is extended a set distance. In another embodiment, stop 118 may be configured to catch on an interior surface of housing 400 near port 420. It should be recognized that any number of structural elements may be used to catch stop 118 and the present disclosure should not be limited to the specific embodiments described herein. Such configurations may provide for extension without fully rotating winding mechanism 200 each use, thereby reducing wear on winding mechanism 200. Referring back to FIG. 5A, stop 118 may be wound onto winding mechanism 200 when retracted.

Elements of attic door rope apparatus 100 may combine to provide for rope 110 to be pulled from a retracted position 120 (FIG. 5A) to an extended position 130 (FIG. 5B), and for rope 110 to be retracted from extended position 130 to retracted position 120. In various embodiments, apparatus 100 may be configured to retract rope 110 to retracted position 120 upon the release of rope 110. In an embodiment, extended position 130 may comprise a position in which all of rope 110 has been unwound from winding mechanism 200 such that only the first end of rope 110 remains secured thereto. In another embodiment, extended position 130 may comprise a position in which a predetermined amount of rope 110 has been unwound from winding mechanism 200 as determined by the positioning of stop 118. In this embodiment, rope 110 may reach extended position 130 when stop 118 catches on rope guide 300 (or other suitable structure), thereby preventing further extension of rope 110.

Figure 6A:
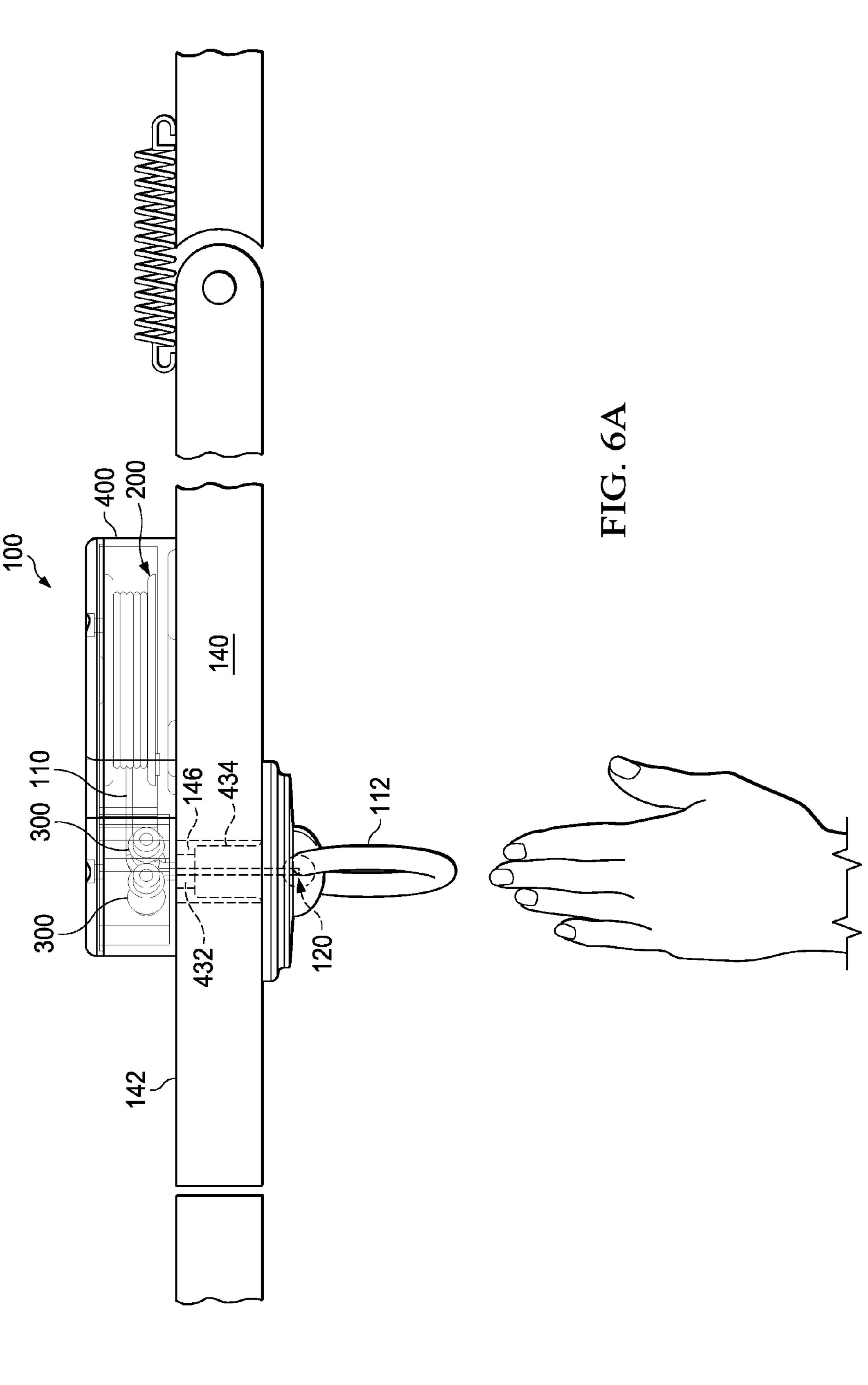
FIG. 6A depicts a side view of an attic door rope apparatus in a retracted position on a closed attic door according to an embodiment of the present disclosure.
Figure 6B:
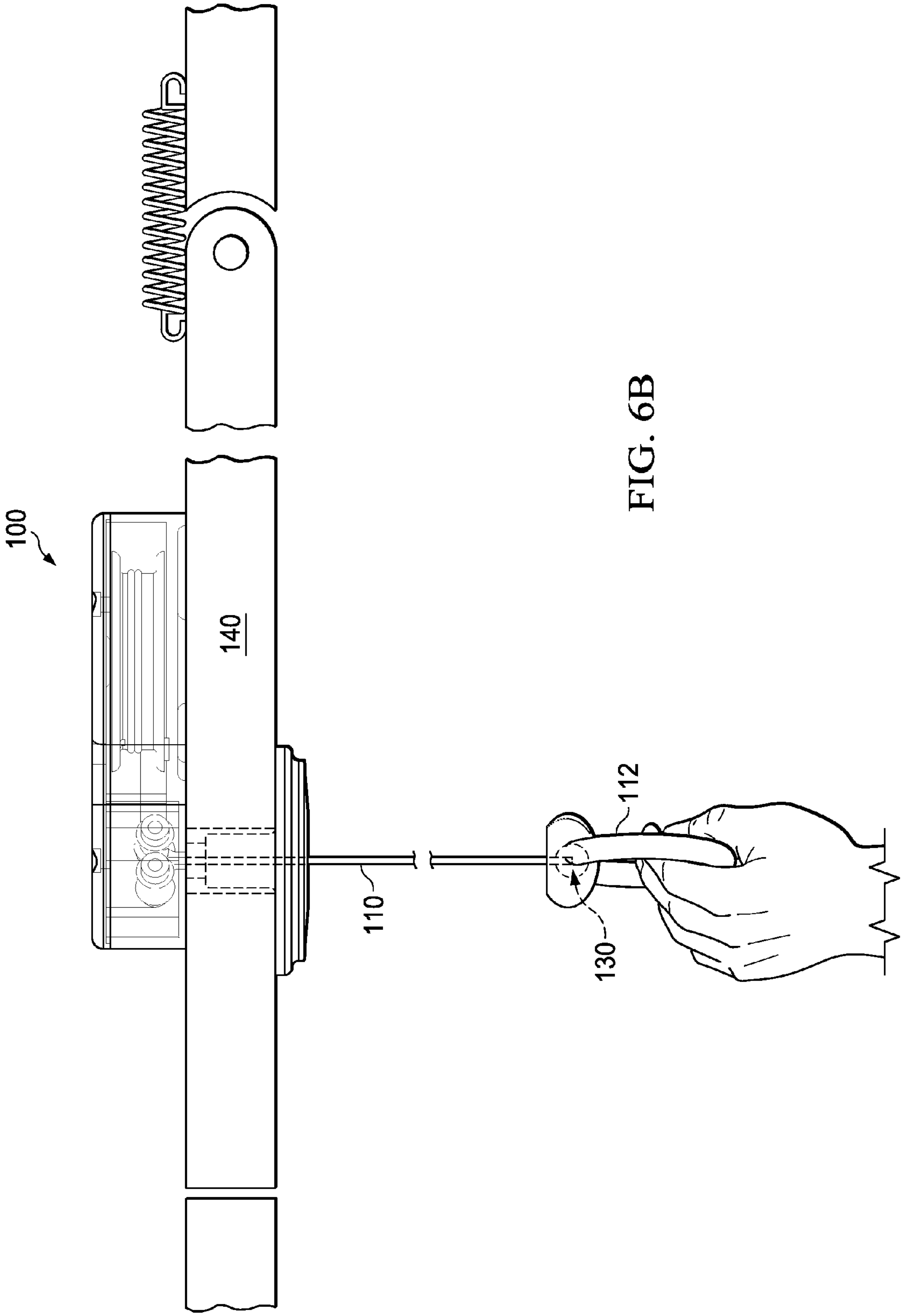
FIG. 6B depicts a schematic view of a rope coupled with an attic door rope apparatus being pulled to an extended position according to an embodiment of the present disclosure.
Figure 6C:
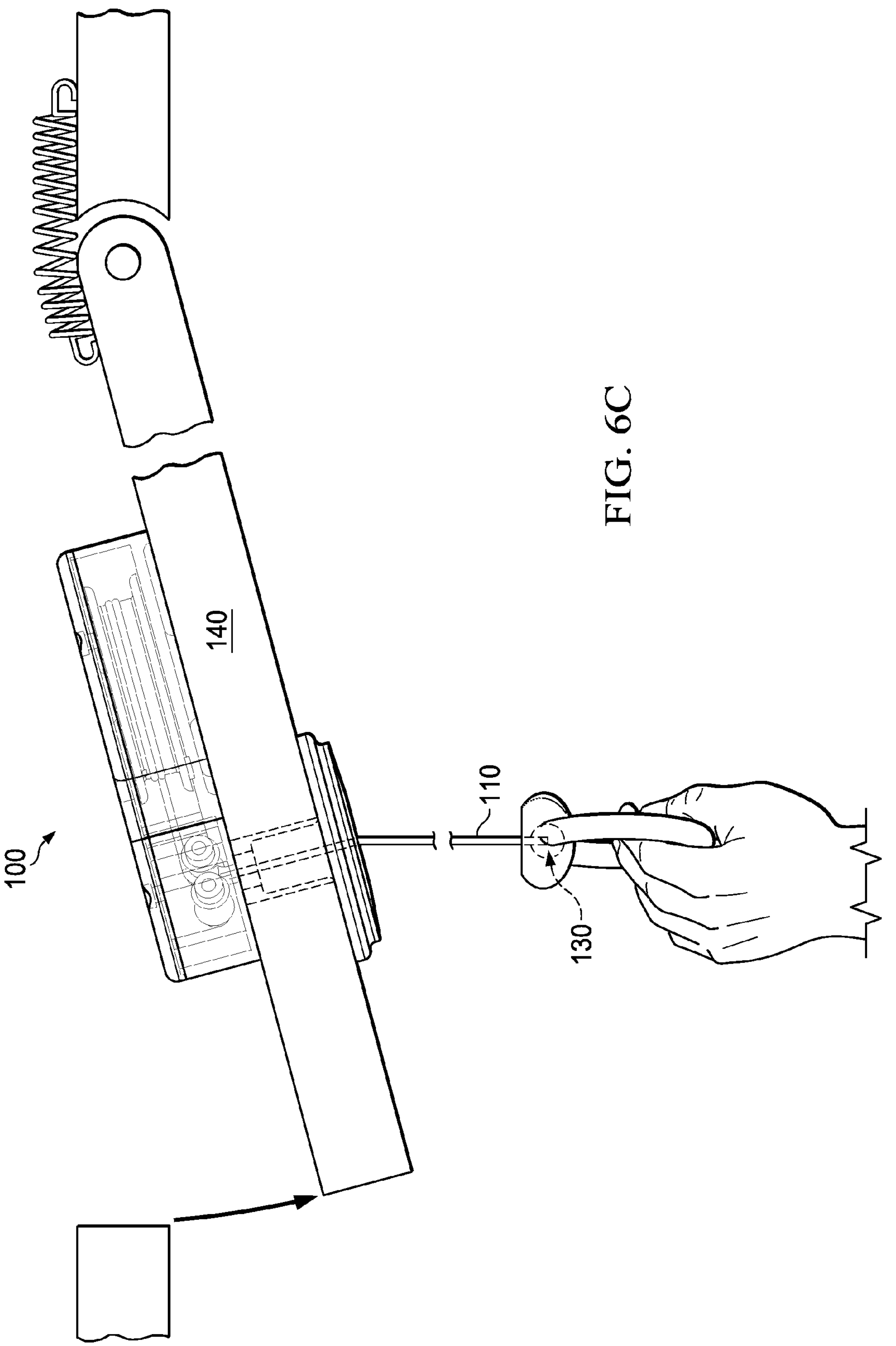
FIG. 6C depicts a schematic view of an attic door opening by a rope coupled with attic door rope apparatus according to an embodiment of the present disclosure.
Figure 6D:
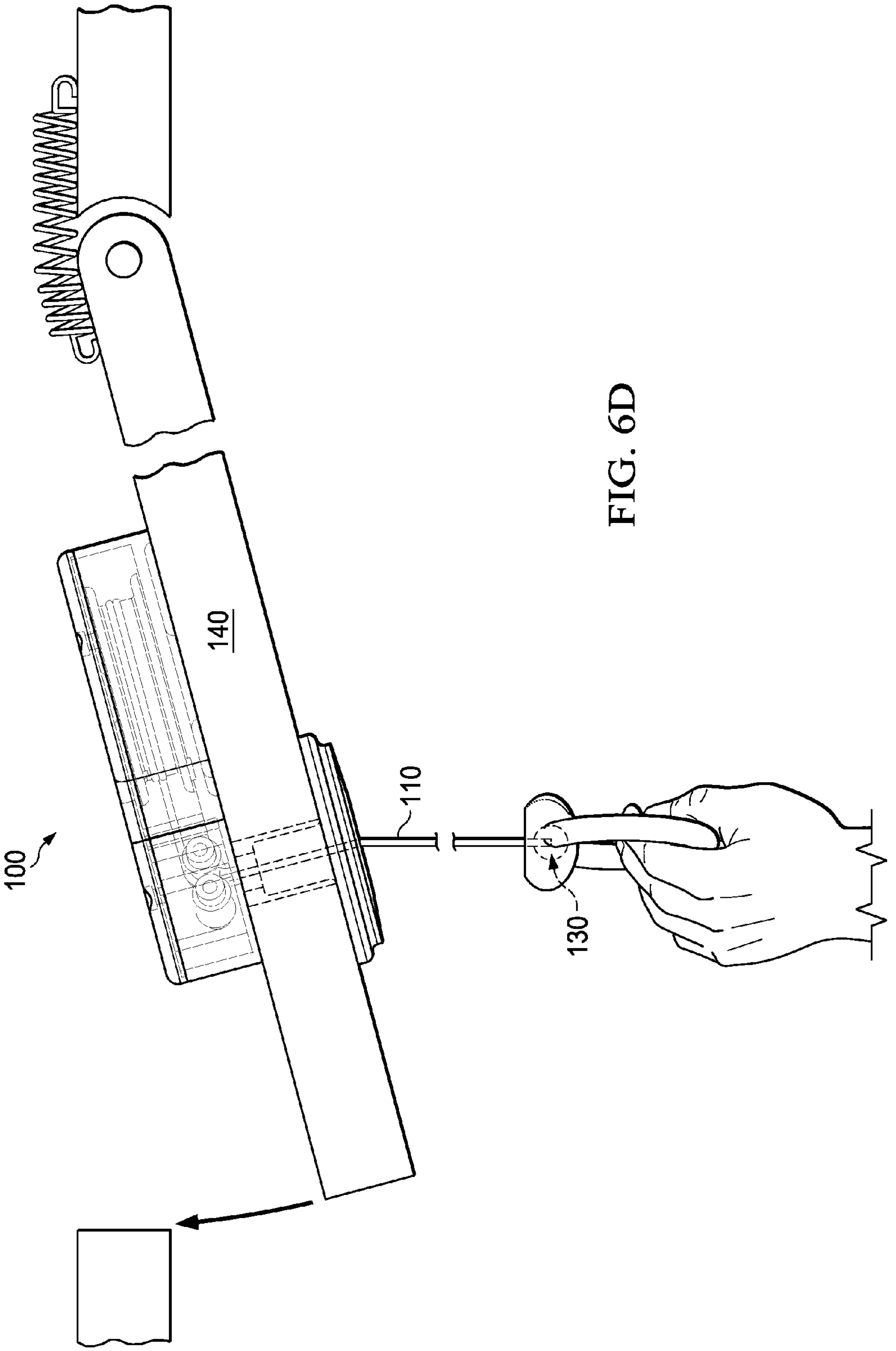
FIG. 6D depicts a schematic view of an attic door being controllably closed by a rope coupled with an attic door rope apparatus according to an embodiment of the present disclosure.
Figure 6E:
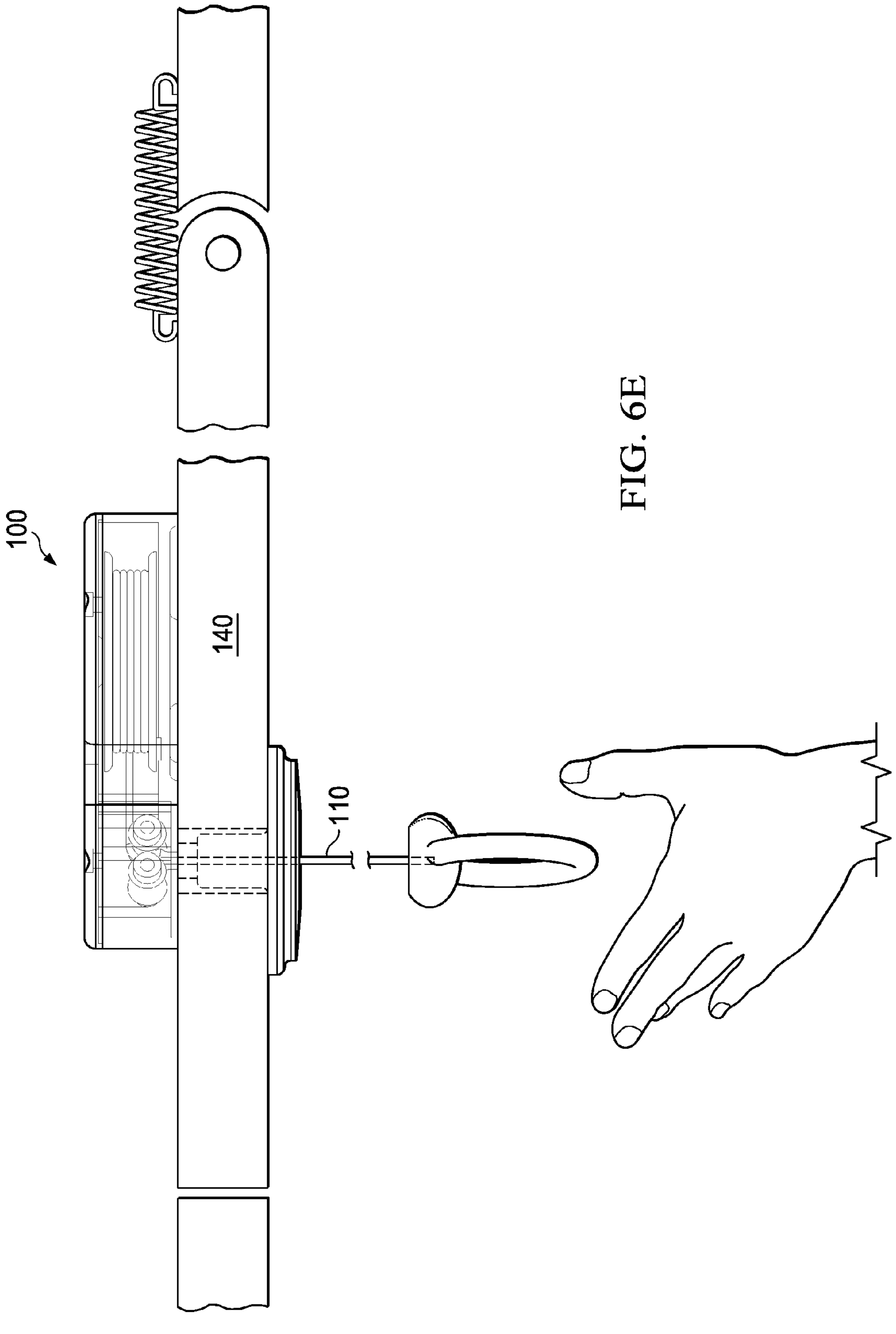
FIG. 6E depicts a schematic view of a rope coupled with an attic door rope apparatus being released from an extended position according to an embodiment of the present disclosure.
Figure 6F:
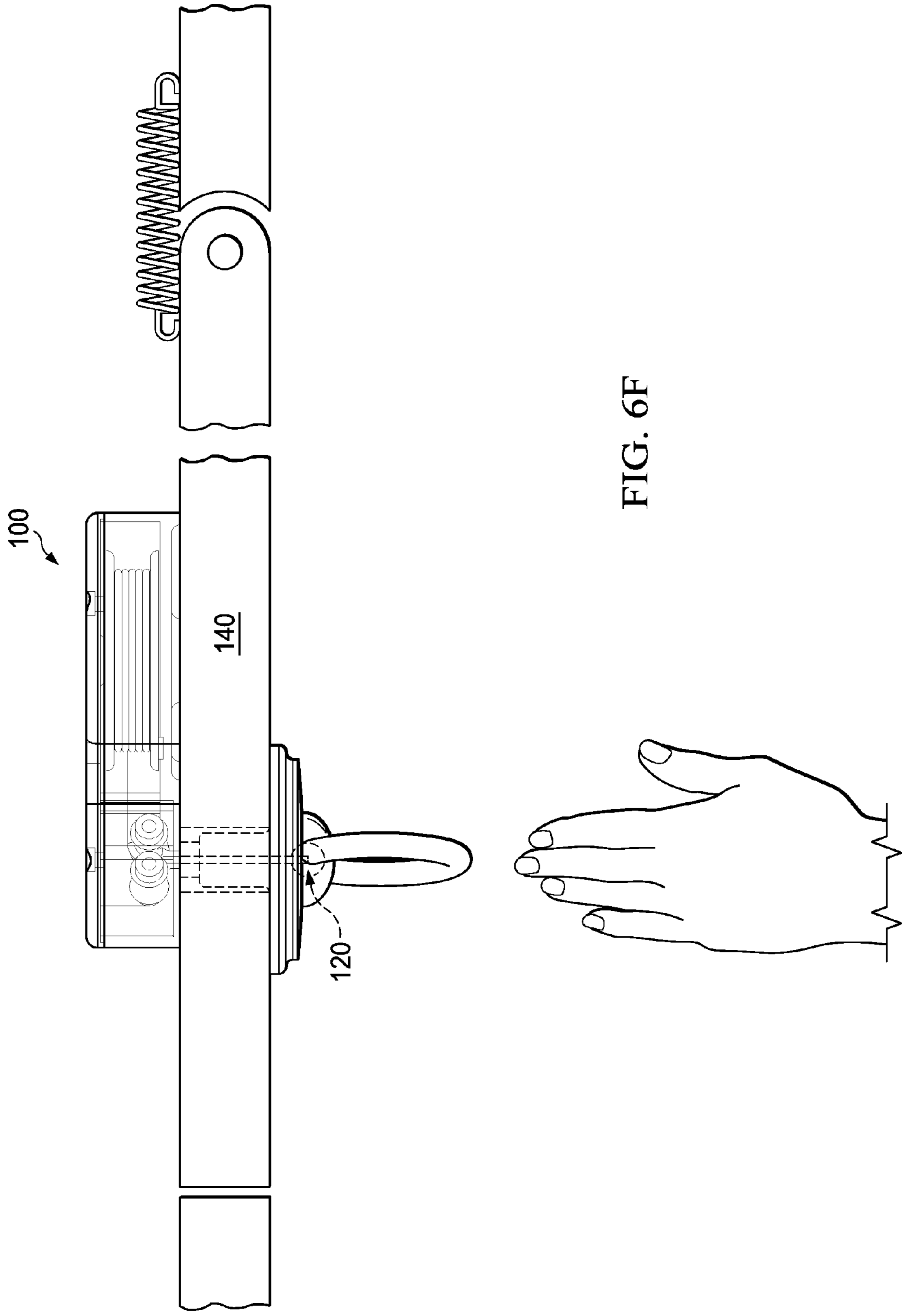
FIG. 6F depicts a side view of an attic door rope apparatus in a retracted position on a closed attic door according to an embodiment of the present disclosure.

Referring now to FIGS. 6A-6F, in operation of various embodiments, attic door rope apparatus 100 may be mounted to interior surface 142 of attic door 140. A first end of rope 110 may be secured to winding mechanism 200, and a second end may be routed through rope guide 300 and through port 420 (not shown) of housing 400. Rope 110 may then be routed through hole 146 in attic door 140 (and possibly through hollow elongated member 432 and hollow end cap 434, if equipped), and into the room below, where grasping feature 112 may be attached. Beginning in retracted position 120 (FIG. 6A), rope 110 may be pulled downward from the room below to extended position 130 (FIG. 6B). A reaching tool or stepladder may be needed to reach rope 110 from below in refracted position 120. In another embodiment (not shown), attic door rope apparatus 100 may be mounted to exterior surface of attic door 140. From extended position 130, the second end of rope 110 may be further pulled down, thereby pulling attic door 140 open (FIG. 6C). With attic door 140 fully opened, rope 110 may be released, and stored-energy mechanism 230 (not shown) may cause rope 110 to wind back onto winding mechanism 200 and back to retracted position 120. When a user wishes to close attic door 140, feature 112 or another portion of rope 110 may be grasped whilst simultaneously raising attic door 140. Rope 110, beginning in retracted position 120, may unwind from winding mechanism 200 as attic door closes until it reaches extended position 130 (FIG. 6D). Rope 110 may be pulled with a downward force slightly less than the upward closing force imposed by the springs of attic door 140 in order to control the closing speed of attic door 140. When attic door 140 is closed (FIG. 6E), rope 110 may be released and thereby retracted onto winding mechanism 200 to a retracted position 120 (FIG. 6F).

Figure 7:
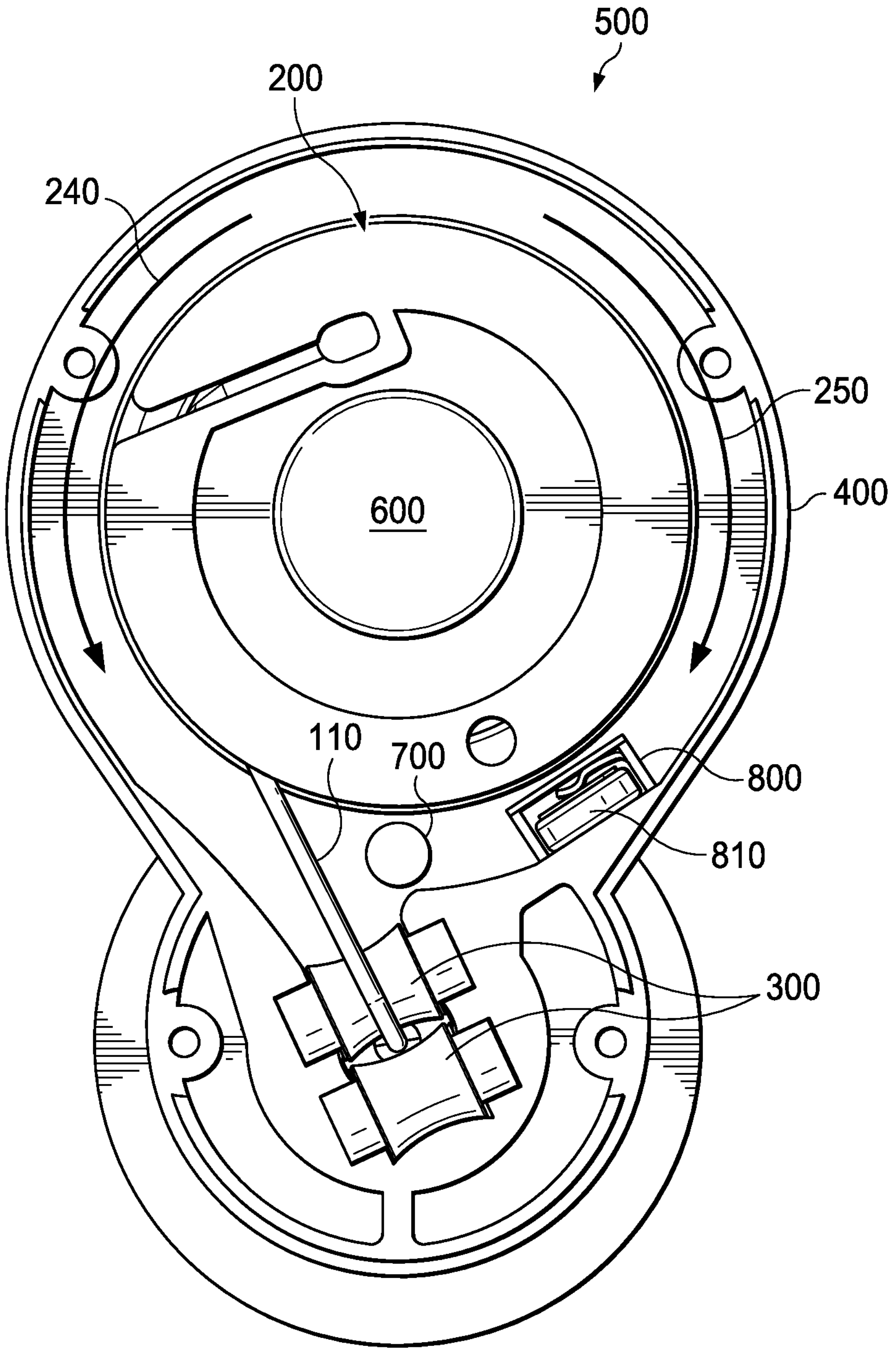
FIG. 7 depicts a top cutaway view of an attic door rope apparatus according to an embodiment of the present disclosure.
Figure 8A:
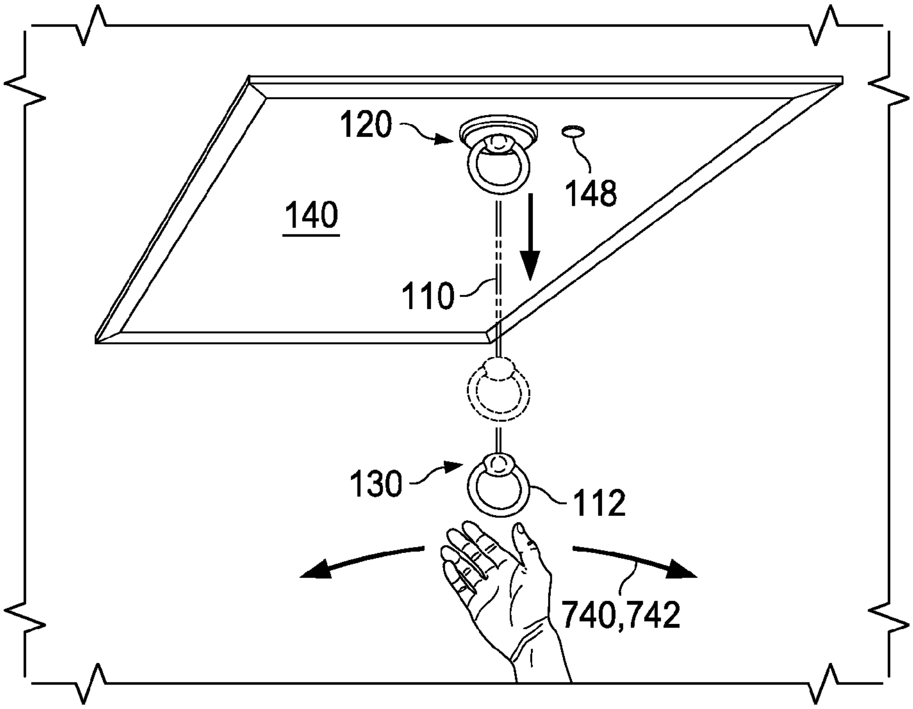
FIG. 8A depicts a schematic view of an attic door rope apparatus extending a rope in response to a command detectable by a sensor according to an embodiment of the present disclosure.
Figure 8B:
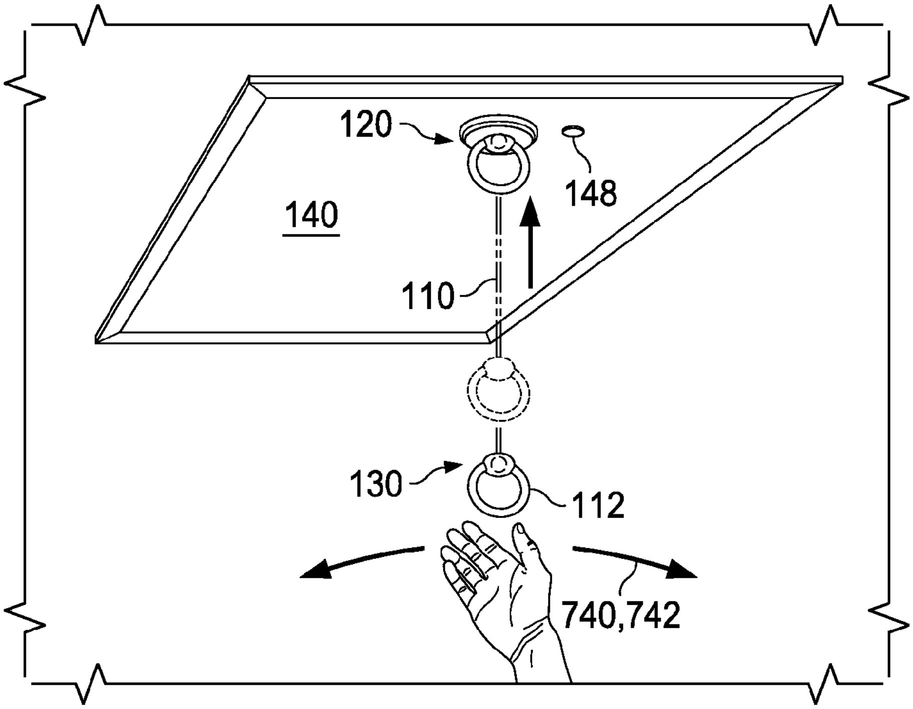
FIG. 8B depicts a schematic view of an attic door rope apparatus retracting a rope in response to a command detectable by a sensor according to an embodiment of the present disclosure.

FIGS. 7-8B illustrate representative embodiments of attic door rope apparatus 500 and parts thereof. It should be understood that the components of attic door rope apparatus 500 and parts thereof shown in FIGS. 7-8B are for illustrative purposes only, and that any other suitable components or subcomponents may be used in conjunction with or in lieu of the components comprising attic door rope apparatus 500 and the parts of attic door rope apparatus 500 described herein.

Referring now to FIG. 7, attic door rope apparatus 500 is depicted. Apparatus 500 may generally comprise winding mechanism 200, rope guide 300, and/or housing 400 as previously described, and may further comprise motor 600, sensor 700, and/or power source 800. Attic door rope apparatus 500 may be configured to wind and unwind rope 110 using motor 600 upon receiving a command from sensor 700.

Motor 600 may comprise any suitable electrical motor. In an embodiment, motor 600 may comprise a stepper motor. Many stepper motors are brushless DC electric motors that divide a full rotation into a number of equal steps. Stepper motors may be commanded to move to and hold at one of these steps without a feedback sensor. Motor 600 may be coupled with winding mechanism 200 in any suitable manner to operate winding mechanism in at least first unwinding motion 240, and possibly in second, substantially opposite winding motion 250. In an embodiment, motor 600 may be disposed in a location substantially axially offset from winding mechanism 200. In one such embodiment, housing 400 may comprise a raised compartment in a top surface thereof to accommodate motor 600 in said axially offset location. In another embodiment, motor 600 may be in a location substantially radially aligned with winding mechanism 200. Such an embodiment may provide for a housing having a wider footprint, but reduced thickness. It should be recognized that any number of configurations may be used to package motor 600 in a manner suitable to couple with winding mechanism 200, and the present disclosure should not be limited to the specific embodiments described herein. In an embodiment, winding mechanism 200 may comprise stored-energy mechanism 230 similar to that previously described in the context of apparatus 100 configured to apply a torque to winding mechanism 200 in the direction of second winding motion 250. Such an embodiment may require only motor 600 configured to effect first unwinding motion 240, as stored-energy mechanism 230 may effect second winding motion 250 when motor 600 is disengaged. In various embodiments, motor 600 may be coupled above, below, adjacent to, or in the center of winding mechanism 200.

Sensor 700 may comprise any suitable mechanism for sensing command 740 initiated by a user and issuing an electrical signal to motor 600 in response. In various embodiments, sensor 700 may comprise an optical sensor capable of detecting motion (such as an infrared optical sensor) or detecting interruptions in an infrared beam projected there from. In an embodiment, an optical sensor may be in optical communication with surroundings outside of housing 400. For example, an optical sensor may reside inside housing 400 proximate to or flush with an opening in housing 400. In an embodiment, this opening may be in a bottom surface of housing 400 so as to aim the optical sensor into a room below through sensor port 148 (later described in FIGS. 8A and 8B). In various embodiments, sensor 700 may comprise touch sensitive mechanism, such as a button or touch screen. In various embodiments, the mechanism may be remotely located from apparatus 500, possibly providing for easier access by a user. In an embodiment, sensor 700 may comprise a wireless receiver (in electrical communication with motor 600) for receiving signals sent from the mechanism. In some ways, some embodiments of remotely located mechanisms may be analogized to doorbell-like operation, allowing a user to initiate a touch command from a convenient location.

Power source 800 may comprise any suitable power source including, but not limited to, battery power and/or ground power, capable of powering motor 600, sensor 700 and the wireless receiver. In an embodiment, power source 800 may comprise AC power from a low voltage transformer, similar to that used for a doorbell ringer. In another embodiment, power source 800 may comprise one or more batteries 810. In an embodiment, single power source 800 may power motor 600 and sensor 700. In another embodiment, separate power sources 800 may power motor 600 and sensor 700. Motor 600, sensor 700, and power source 800 may be disposed in any suitable arrangement within housing 400, or may be disposed outside of housing 400, but otherwise in mechanical and/or electrical connection with components therein.

Referring now to FIGS. 8A and 8B, a sensor may be configured to issue a command signal to a motor to turn a winding mechanism in response to one or more user commands 740. Referring to FIG. 8A, a sensor may be configured to issue a command signal to a motor to turn a winding mechanism in first unwinding motion 240 (FIG. 7) in response to user command 740, thereby dispensing rope 110. Referring to FIG. 8B, a sensor may be configured to issue a command signal to a motor to turn a winding mechanism in second unwinding motion 250 (FIG. 7) in response to a second user command 740, thereby retracting rope 110.

With motion or beam-disruption detecting sensors, user command 740 may comprise any suitable motion detectable by the sensor. In an embodiment, user command 740 may comprise waving motion 742 of the hand. In another embodiment, the sensor may be configured to respond only to user command 740 executed within an approximate predetermined distance. In yet another embodiment, the sensor may be configured to respond on a time delay—that is, the sensor may not issue a command signal to a motor until it detects user command 740 that lasts for a predetermined amount of time (for example, 2 seconds). Such features may prevent the attic door rope apparatus from operating in response to other motions, such as a person walking under the attic door 140. For embodiments comprising a touch sensitive mechanism, user command 740 may comprise any suitable touch or physical contact (i.e. the push of a button, or a tap on touch screen) detectable by the mechanism.

In operation of various embodiments, attic door rope apparatus 500 (FIG. 7) may be mounted to an interior surface of attic door 140 as previously described in the context of apparatus 100. The attic door rope apparatus may be mounted such that sensor 700 is in optical communication with the room below. In an embodiment where sensor 700 is mounted to an interior surface of attic door 140, it may be aligned with sensor port 148 extending through attic door 140. Beginning in retracted position 120, user may initiate first user command 740 detectable by sensor 700. Upon detecting first user command 740, sensor 700 may issue a signal to motor 500 to initiate first unwinding motion 240. Motor 600 may cause winding mechanism 200 to extend rope 110 into the room below. In an embodiment, attic door rope apparatus 500 may be configured to dispense rope 110 until it reaches extended position 130. In another embodiment, the attic door rope apparatus may be configured to dispense rope 110 for a specific duration, perhaps a duration correlating with the duration of first user command 740. Similar to embodiments of attic door rope apparatus 100 previously disclosed, extended position 130 may depend on the installation of stop 118 on rope 110. Embodiments having stop 118 may provide for door 140 to be pulled down from extended position 130 without fully extending the winding mechanism each use, thereby reducing wear on the winding mechanism 200 and motor 600. From extended position 130, the second end of rope 110 may be further pulled down, thereby pulling attic door 140 open. When a user wishes to close attic door 140, grasping feature 112 or another portion of rope 110 may be grasped whilst simultaneously raising attic door 140. Rope 110, beginning in extended position 130 may be pulled with a downward force slightly less than the upward closing force imposed by the springs of attic door 140 in order to control the closing speed of attic door 140. When attic door 140 is closed, user may initiate second user command motion 740 detectable by sensor 700. Upon detecting second user command 740, sensor 700 may issue a signal to motor 600 to initiate second winding motion 250. Motor 600 may cause winding mechanism 200 to retract rope 110 from the room below. In an embodiment, the attic door rope apparatus may be configured to retract rope 110 until it reaches retracted position 120. In another embodiment, attic door rope apparatus 500 may be configured to retract rope 110 for a specific duration, perhaps a duration correlating with the duration of second user command 740.

It may be advantageous to set forth definitions of certain words and phrases used in this patent document. The term "couple" and its derivatives refer to any direct or indirect communication between two or more elements, whether or not those elements are in physical contact with one another. The terms “include” and “comprise,” as well as derivatives thereof, mean inclusion without limitation. The term “or” is inclusive, meaning and/or. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An attic door rope apparatus for retractably storing an attic door pull rope, the apparatus comprising:

a winding mechanism configured to rotate in an unwinding direction and a winding direction to dispense the attic door pull rope;

one or more rope guides configured to facilitate the travel of the attic door pull rope from the winding mechanism;

a motor coupled with the winding mechanism configured to turn the winding mechanism in at least the unwinding direction;

a sensor configured to detect a user command and send a command signal to the motor to turn the winding mechanism to dispense the attic door pull rope; and a power source in electrical communication with the motor and the sensor.

2. The attic door rope apparatus according to claim 1, comprising a stored-energy mechanism configured to apply a torque to the winding mechanism in the winding direction.

3. The attic door rope apparatus according to claim 2, the stored-energy mechanism comprising a torsion spring.

4. The attic door rope apparatus according to claim 1, wherein the motor is configured to turn the winding mechanism in the winding direction.

5. The attic door rope apparatus according to claim 4, wherein the sensor is configured to command the motor to turn the winding mechanism in the unwinding direction in response to a first user command, and in the winding direction in response to a second user command.

6. The attic door rope apparatus according to claim 1, wherein the motor is a stepper motor.

7. The attic door rope apparatus according to claim 1, wherein the sensor is an optical sensor.

8. The attic door rope apparatus according to claim 7, wherein the user command comprises a hand waving motion in detectable range of the optical sensor.

9. The attic door rope apparatus according to claim 1, wherein the sensor is a touch sensitive mechanism.

10. The attic door rope apparatus according to claim 1, wherein the sensor is configured to command the motor to turn the winding mechanism for a duration proportional to the duration of the user command.

11. The attic door rope apparatus according to claim 1, wherein the sensor is configured to issue the command signal to the motor only after detecting the user command for a predetermined duration.

* * * * *